(12) United States Patent
Ohara et al.

(10) Patent No.: US 8,528,377 B2
(45) Date of Patent: Sep. 10, 2013

(54) PIPE EXPANDING APPARATUS OF THIN WALL STAINLESS STEEL PIPE

(75) Inventors: Koji Ohara, Okayama (JP); Hiroshi Ashida, Okayama (JP)

(73) Assignee: O.N. Industries, Ltd., Okayama (JP)

( * ) Notice: Subject to any disclaimer, the term of this patent is extended or adjusted under 35 U.S.C. 154(b) by 320 days.

(21) Appl. No.: 12/956,276

(22) Filed: Nov. 30, 2010

(65) Prior Publication Data

US 2011/0226034 A1   Sep. 22, 2011

(30) Foreign Application Priority Data

Mar. 19, 2010  (JP) ................................. 2010-063834

(51) Int. Cl.
*B21D 39/20* (2006.01)
(52) U.S. Cl.
USPC .................................. 72/58; 72/62; 72/466.8
(58) Field of Classification Search
USPC .................. 72/58, 61, 62, 393, 465.1, 466.8; 29/421.1, 523
See application file for complete search history.

(56) References Cited

U.S. PATENT DOCUMENTS

| | | | | |
|---|---|---|---|---|
| 2,458,854 A | * | 1/1949 | Hull et al. | 72/58 |
| 3,627,336 A | * | 12/1971 | Lawson | 277/584 |
| 4,006,619 A | * | 2/1977 | Anderson | 72/54 |
| 4,320,568 A | * | 3/1982 | Herrod et al. | 29/421.1 |
| 4,418,457 A | * | 12/1983 | Mueller | 29/890.044 |
| 4,581,817 A | * | 4/1986 | Kelly | 29/727 |
| 4,685,191 A | * | 8/1987 | Mueller et al. | 29/523 |
| 4,779,333 A | * | 10/1988 | Rabe et al. | 29/727 |
| 5,233,855 A | * | 8/1993 | Maki et al. | 72/62 |

FOREIGN PATENT DOCUMENTS

JP    3-234328    * 10/1991

* cited by examiner

*Primary Examiner* — Edward Tolan
(74) *Attorney, Agent, or Firm* — McClure, Qualey & Rodack, LLP

(57) ABSTRACT

The invention provides a pipe expanding apparatus of a thin wall stainless steel pipe in which a strain is not generated in a flange and a yoke, even when a pipe expanding rubber swells. The invention includes a flange which forms one inclined surface of a chevron shaped projection portion by internally fitting a thin wall stainless steel pipe, a yoke which forms the other inclined surface of the chevron shaped projection portion by being coupled at its one end side to the flange, and is coupled to a cylinder at its other end side, a guide rod which is coupled to a piston of the cylinder, and a pipe expanding rubber which is pinched between a step portion of the guide rod and a backup ring and expands the thin wall stainless steel pipe.

3 Claims, 10 Drawing Sheets

(FRONT SIDE)                              (REAR SIDE)

(FRONT SIDE)  (REAR SIDE)

(FRONT SIDE)     (REAR SIDE)

(FRONT SIDE)　　　(REAR SIDE)

PIPE EXPANDING APPARATUS OF THIN WALL STAINLESS STEEL PIPE

CROSS-REFERENCE TO RELATED APPLICATION

This application claims priority to Japanese patent application having serial number 2010-063834, filed on Mar. 19, 2010, which is incorporated by reference in its entirety.

BACKGROUND OF THE INVENTION (1) Field of the Invention

The present invention relates to a pipe expanding apparatus of a thin wall stainless steel pipe, which expands a pipe for forming a chevron projection portion having a chevron cross sectional shape along an outer peripheral surface of an end portion of the thin wall stainless steel pipe.

(2) Description of Related Art

With regard to a pipe expanding apparatus of a thin wall stainless steel pipe, a structure described in Japanese Examined Patent Publication No. 64-137 filed by the applicant of the subject application has been already known. As shown in FIG. 8, a pipe expanding apparatus 101 of a thin wall stainless steel pipe has a hydraulic cylinder 102, a piston rod 104 having a piston portion 103 which is slidably operated by a hydraulic pressure within the hydraulic cylinder 102, a restoring spring 105 biasing the piston rod 104 to a rear side (a right side in the drawing), a pipe expanding head 106 provided in a rear end portion of the hydraulic cylinder 102, a coupling pipe 108 coupling the piston rod 104 and a pressure application rod 107, a guide ring 110 arranged in an inner side of a fitting inner hole 109 of the pipe expanding head 106 so as to be immovable forward, a pipe expanding rubber 112 arranged between the guide ring 110 and a rubber restraining step portion 111 of the pressure application rod 107, and a female thread portion 114 engaging with a male thread portion 113 formed in an outer peripheral surface of the pipe expanding head 106, and the pipe expanding apparatus 101 is structured such as to have a ball head lock nut 117 inserting a thin wall stainless steel pipe 116 to a fitting hole 115, and is structured such that taper portions 119 and 120 are formed respectively in such a manner that a peripheral groove 118 having a chevron shaped cross section is formed in a joint portion between an inner peripheral surface of the pipe expanding head 106 and the inner peripheral surface of the ball head lock nut 117, in a state in which the pipe expanding head 106 and the ball head lock nut 117 are engaged and fixed.

The pipe expansion of the thin wall stainless steel pipe 116 by the conventional pipe expanding apparatus 101 of the thin wall stainless steel pipe as mentioned above is carried out as follows. Specifically, in a state in which a leading end portion 116a of the thin wall stainless steel pipe 116 is fitted into the fitting inner hole 109 of the pipe expanding head 106, the piston rod 104 is actuated forward, that is, to an opposite side to the thin wall stainless steel pipe 116 by a hydraulic pressure, as shown in FIG. 9. Accordingly, since the pressure application rod 107 coupled to the piston rod 104 is moved forward, the pipe expanding rubber 112 is pressed between the guide ring 110 and the step portion 111 of the pressure application rod 107, so that the pipe expanding rubber 112 is reduced in length in a back and forth direction, and swells outward in a diametrical direction. Further, since the peripheral groove 118 (refer to FIG. 8) having the chevron shaped cross section is formed in an outer periphery of the thin wall stainless steel pipe 116 extruded outward in the diametrical direction by the swelling pipe expanding rubber 112, by a taper portion 119 of the pipe expanding head 106 and a taper portion 120 of the ball head lock nut 117, the thin wall stainless steel pipe 116 swells in such a manner as to be along the peripheral groove 118 having the chevron shaped cross section, and a chevron shaped pipe expanding portion 122 is formed.

When the thin wall stainless steel pipe 116 expanded as mentioned above is connected to a joint 123, the pressure application rod 107, the pipe expanding rubber 112 and the guide ring 110 are taken out from an inner portion of the thin wall stainless steel pipe 116 after releasing the engagement between the pipe expanding head 106, and the male thread portion 113 and the female thread portion 114 of the ball head lock nut 117. Further, as shown in a right side in FIG. 10, by making the opening portion of the joint 123 be opposed to an end portion of the thin wall stainless steel pipe 116 and an opening end portion of the ball head lock nut 117 so as to engage the male thread formed in an outer periphery of the joint 123 and the female thread portion 114 of the ball head lock nut 117, as shown in a left side in FIG. 10, an inclined surface 122a of the chevron shaped pipe expanding portion 122 is pressed in a direction of the joint 123, and a gasket 121 which is previously fitted to an inner side of an opening portion of the joint 123 is crimped to another inclined surface 122b, and a disc spring 125 fitted to the outer periphery of the male thread is crimped between a projection of the joint 123 and a leading end of the ball head lock nut 117 as necessary. The disc spring 125 prevents the engagement between the joint 123 and the ball head lock nut 117 from being loosened and confirms a fastening failure by a reaction thereof. Accordingly, the thin wall stainless steel pipe 116 is securely coupled to the joint 123 without generating any fluid leakage from a connection portion to the joint 123.

In the conventional pipe expanding apparatus 101 of the thin wall stainless steel pipe as mentioned above, the pipe expanding rubber 112 swelled by the pressure application while being sandwiched between the guide ring 110 and the step portion 111 by moving forward the pressure application rod 107 in accordance with a forward movement (a left side in the drawing) of the piston rod 104 from a state in FIG. 8 to a state in FIG. 9 swells out the thin wall stainless steel pipe 116 in a chevron shape along the chevron shaped peripheral groove 118 formed by an inner peripheral surface of the pipe expanding head 106 and an inner peripheral surface of the ball head lock nut 117, whereby the pipe expanding portion 122 is formed. At this time, the pressure in an outer direction during the swelling of the pipe expanding rubber 112 also acts on the pipe expanding head 106 and the ball head lock nut 117, and a strain is generated. Due to the strain, there is such a problem that the engagement between the pipe expanding head 106, and the male thread portion 113 and the female portion 114 of the ball head lock nut 117 is hard to be disengaged, the ball head lock nut 117 opens outside so as to obstruct an engagement with the joint 123 in the later step, or the like. Further, since it is necessary to secure a necessary length for engaging and firmly attaching a male thread of the joint 123 and the female thread 114 of the ball head lock nut 117, there is such a problem that a whole of the apparatus is enlarged.

The present invention is made in view of the above problem, and provides a pipe expanding apparatus of a thin wall stainless steel pipe in which a member supporting the thin wall stainless steel pipe 116 at the time of pipe expansion of the pipe expanding head 106, the ball head lock nut 117 or the like can prevent a force from acting in an outer direction so as to prevent the strain from being generated, even when the pipe expanding rubber 112 swells. Further, the present invention provides a pipe expanding apparatus of a thin wall stainless steel pipe which can achieve a downsizing of the apparatus, and can achieve convenience for transporting in a weight saving manner.

SUMMARY OF THE INVENTION

Means for solving the problem mentioned above is as follows. Specifically, according to a first aspect of the present invention, there is provided a pipe expanding apparatus of a thin wall stainless steel pipe, including: a flange having a fitting inner hole to which the thin wall stainless steel pipe is internally fitted, a first taper portion which is formed in a front side of the fitting inner hole and is inclined in such a manner that a front side is expanded, a protruding annular portion which has approximately the same inner diameter as an inner diameter of a front end portion of the first taper portion and has a predetermined thickness and protrudes forward, and a joint coupling hole which inserts a bolt coupling to the joint in an outer peripheral portion; a yoke detachably fixed to a front side of the flange, having a fitting hole to which an end portion of the thin wall stainless steel pipe is internally fitted, a rod sliding hole which is arranged in a front side of the fitting hole and has a smaller diameter than the fitting hole, and an expanded inner hole portion which is expanded at approximately the same length as a thickness of the protruding annular portion, and forming an outer peripheral annular collar portion capable of being coupled to a second taper portion inclined in such a manner that a front side is contracted, and the flange via a coupling device in an outer peripheral side of the expanded inner hole portion; a backup ring fitted to an inner side of the fitting hole in an inner side of the fitting inner hole and an end portion of the thin wall stainless steel pipe arranged in an inner side in a diametrical direction of the fitting hole; a guide rod having a sliding portion which is movable in a back and forth direction within the rod sliding hole, by being coupled to a piston which is movable in a back and forth direction by a drive source in an inner portion of the cylinder coupled to the yoke, and an outer fitting portion which externally fits the thin wall stainless steel pipe having a larger diameter than the sliding portion and positioned in a rear side; and a pipe expanding rubber externally fitted to the sliding portion between the backup ring and a step portion of the sliding portion and the outer fitting portion of the guide rod, and pinched between the step portion and the backup ring.

According to a second aspect of the present invention, in the pipe expanding apparatus of a thin wall stainless steel pipe according to the first aspect, the coupling device is provided with a pinching lever which comes into contact with an outer surface of the flange, and a coupling bolt which fastens and fixes the pinching lever to the outer peripheral annular collar portion of the yoke via a spaced pipe.

According to a third aspect of the present invention, in the pipe expanding apparatus of a thin wall stainless steel pipe according to the first or second aspect, the pipe expanding rubber is formed in a ring shape, and is formed in a taper shape in such a manner that a diameter of an outer periphery of an end portion in a back and forth direction becomes smaller than that of a center portion.

According to the means of the first aspect, most of the force transmitted when the thin wall stainless steel pipe is expanded outward in a chevron shape by the swelling of the pipe expanding rubber is transmitted to the yoke through the first taper portion of the flange positioned outside the thin wall stainless steel pipe and the protruding annular portion, and a force transmitted to the second taper portion is transmitted to the yoke. Accordingly, the outward force is hardly applied to the flange, and a strain is not generated. Further, since the outer peripheral annular collar portion is formed in the outer peripheral side of the expanded inner hole portion in which the protruding annular portion of the flange is set, a strain is not generated by receiving the outward force acting on the flange. As mentioned above, according to the pipe expanding apparatus of the thin wall stainless steel pipe of the present invention, since the strain is not generated in the flange and the yoke by the force generated by swelling of the pipe expanding rubber for expanding the thin wall stainless steel pipe, without using a heavy member for the apparatus, it is possible to improve a durability of the yoke, and it is possible to smoothly and accurately carry out the connection between the flange and the joint in the latter step. Further, since the flange and the yoke are fixed by using an additional coupling device in place of the engagement between the male thread and the female thread which are formed respectively, it is easy to release the engagement fixation even if a strain is generated. Further, since it is possible to make a length corresponding to a thread forming distance required for engaging and fixing the male thread and the female thread to be short, it is possible to achieve a downsizing and a weight saving of the apparatus at that degree.

According to the means of the second aspect, since the distance between the flange and the yoke can be kept constant by the spaced pipe, at the time of coupling the flange and the yoke, it is possible to prevent the coupling bolt from being fastened too tightly, whereby it is possible to prevent the strain from being generated in the flange and the yoke.

According to the means of the third aspect, since the center portion is volumetrically expanded more in the outer peripheral direction when the pinching force is applied, by the movement of the guide rod in the forward direction, it is possible to efficiently carry out the pipe expansion.

DETAILED DESCRIPTION OF PREFERRED EMBODIMENTS

Figure 1:
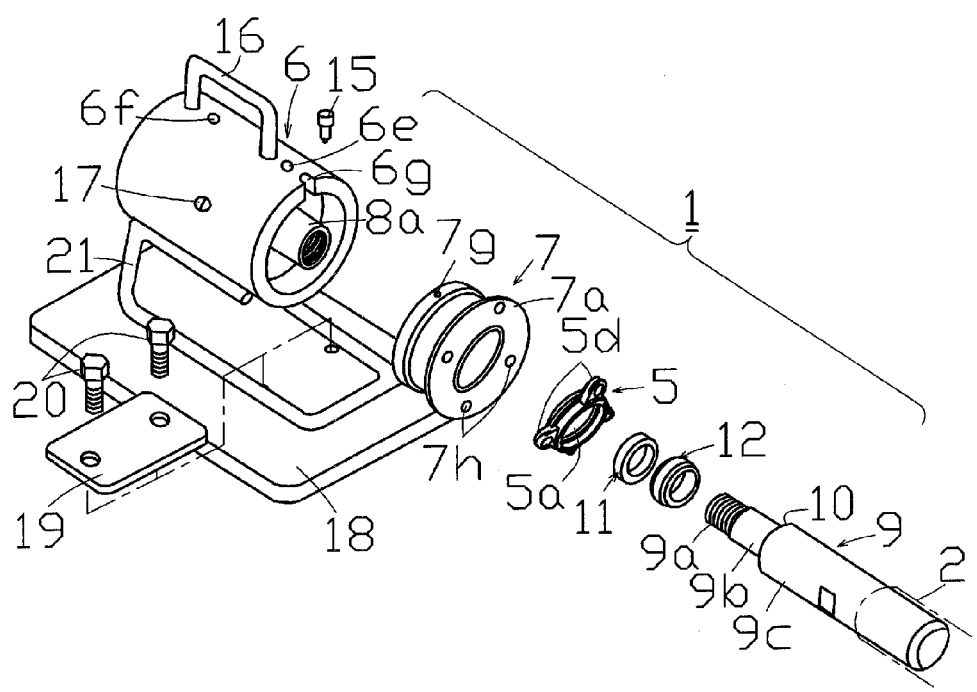
FIG. 1 is an exploded perspective view of a pipe expanding apparatus of a thin wall stainless steel pipe according to an embodiment of the present invention.
Figure 2:
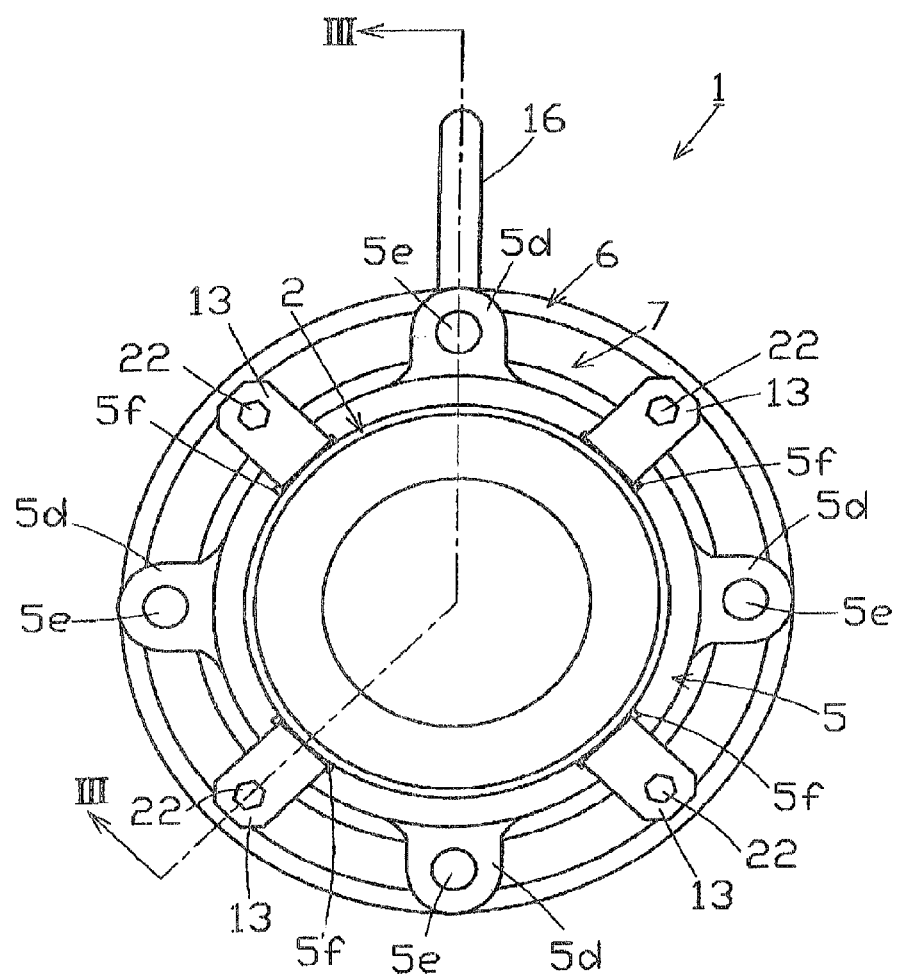
FIG. 2 is a front view of the pipe expanding apparatus of the thin wall stainless steel pipe.

A pipe expanding apparatus 1 of a thin wall stainless steel pipe according to the present invention is provided with a flange 5 which forms one inclined portion 3a of a chevron shaped projection portion 3 at the time of pipe expansion by internally fitting a thin wall stainless steel pipe 2, and is coupled to a joint 4 (refer to FIG. 7) after the pipe expansion, a yoke 7 in which one end side is coupled to the flange 5 so as to form the other inclined portion 3b of the chevron shaped projection portion 3 at the time of the pipe expansion while the other end side is coupled to a cylinder 6, a guide rod 9 which is coupled to a piston 8 of the cylinder 6 so as to move in a back and forth direction within the flange 5, the yoke 7 and the cylinder 6, and a pipe expanding rubber 12 which is pinched between a step portion 10 of the guide rod 9 and a backup ring 11 externally fitted to the guide rod 9 and fitted to an inner side of the yoke 7 so as to swell outward and expand the thin wall stainless steel pipe 2.

The flange 5 has an annular outer appearance as shown in FIGS. 1 to 5, and is provided with a fitting inner hole 5a internally fitting the thin wall stainless steel pipe 2 in a center portion thereof. Further, a first taper portion 5b inclined in such a manner that a front side is expanded, is formed in a front side (a left direction in FIG. 3) of the fitting inner hole 5a of the flange 5. Further, from an end surface in a front side of the flange 5, there is formed a protruding annular portion 5c which has approximately the same inner diameter as an inner diameter of a front end portion of the first taper portion 5b, and protrudes forward in an annular shape while having a predetermined thickness. Further, particularly well expressed in FIG. 5, four protruding portions 5d protruding in an oval shape further in an outward direction from an outer peripheral portion of the flange 5 are provided at even intervals, and each of the protruding portions 5d is provided with a joint coupling hole 5e for coupling to the joint 4. Further, in an end surface in the periphery of the fitting inner hole 5a in a rear side of the flange 5, a circular arc projection 5f to be a contact surface of a pinching lever 13 when being connected to the yoke 7 is formed at a position which corresponds to the approximate center of the adjacent protruding portions 5d (refer to FIG. 5).

Figure 3:
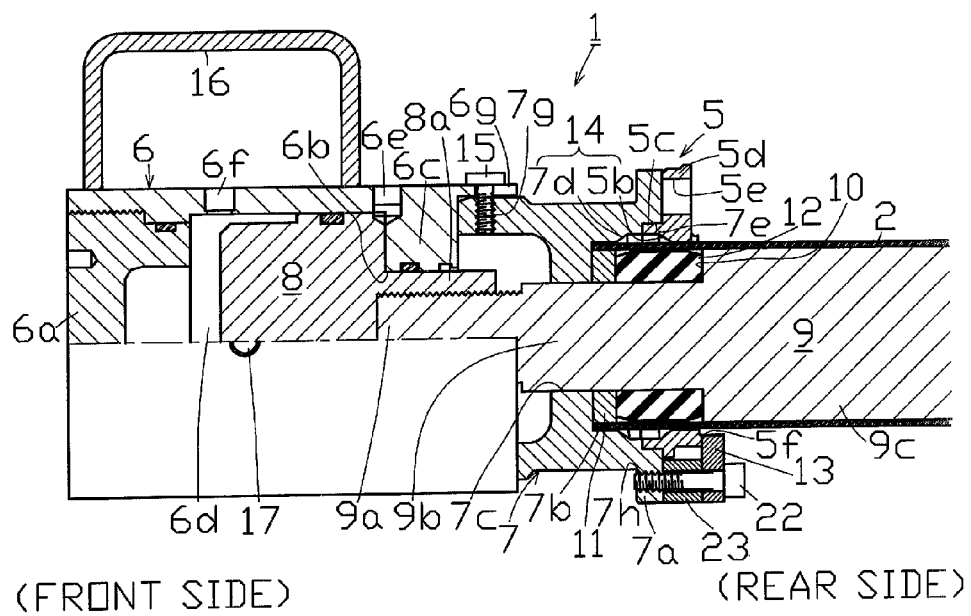
FIG. 3 is a cross sectional view along line III-III in FIG. 2 of the pipe expanding apparatus of the thin wall stainless steel pipe.

The yoke 7 is structured, as shown in FIGS. 1 and 3, such that an annular collar portion 7a is provided in an outer peripheral surface in a rear side, a fitting hole 7b having a predetermined length to which an end portion of the thin wall stainless steel pipe 2 having the same diameter as the fitting inner hole 5a is inserted is formed in an inner center portion, and a rod sliding hole 7c having a smaller diameter than the fitting hole 7b is formed in a front depth side thereof. Further, an inner diameter of an opening end side of the fitting hole 7b in the side in which the annular collar portion 7a is provided forms a second taper portion 7d which is expanded in a taper shape, and a further rear side of the second taper portion 7d is provided with an expanded inner hole portion 7e which is expanded approximately the same length as the thickness of the protruding annular portion 5c, in such a manner that the protruding annular portion 5c of the flange 5 can be inserted. Accordingly, when the flange 5 and the yoke 7 are coupled, the first taper portion 5b and the second taper portion 7b are connected so as to form a chevron shaped space portion 14, and the annular collar portion 7a is positioned in an outer side of the chevron shaped space portion 14. Further, the annular collar portion 7a is provided with coupling holes 7h used at the time of being connected to the flange 5 at predetermined distances. Further, an opposite side (a front side) provided with the annular collar portion 7a is provided with a coupling pin thread hole 7g which engages a coupling pin 15 coupled to the cylinder 6.

Figure 4:
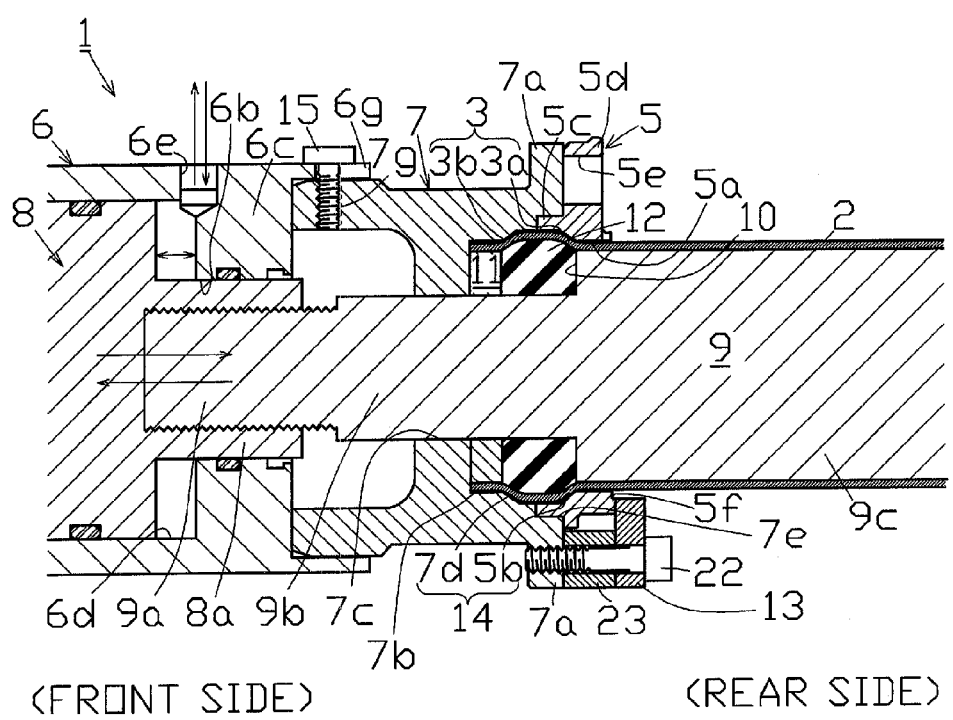
FIG. 4 is an enlarged cross sectional view showing a case where a guide rod is moved forward in FIG. 3.
Figure 5:
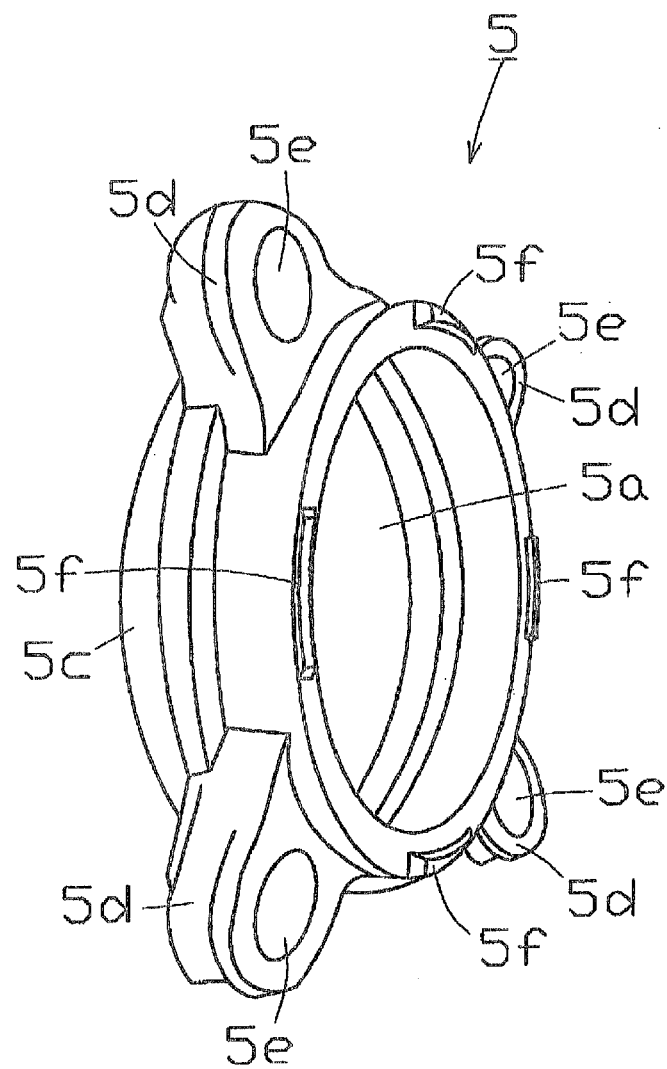
FIG. 5 is a perspective view of a flange.
Figure 6:
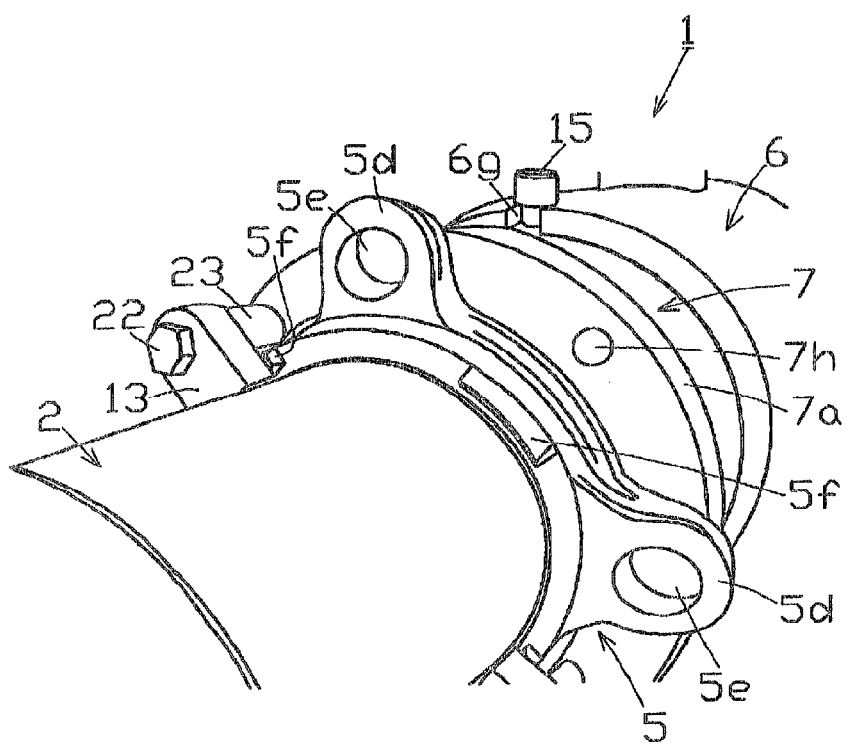
FIG. 6 is a perspective view of the pipe expanding apparatus of the thin wall stainless steel pipe.

The guide rod 9 is provided with a coupling portion 9a in which a male thread is formed in an outer periphery thereof for being coupled to the piston 8 in a front side thereof, as is well expressed in FIGS. 1, 3 and 4, a rear side of the coupling portion 9a is provided with a sliding portion 9b which moves in a back and forth direction within the rod sliding hole 7c, and a rear side of the sliding portion 9b is further provided with an outer fitting portion 9c which has a larger diameter than the sliding portion 9b and is inserted into the thin wall stainless steel pipe 2. Further, a step portion 10 generated due to a difference in diameter is formed between the outer fitting portion 9c and the sliding portion 9b.

The cylinder 6 is structured such that a front end is sealed by a lid member 6a so as to be releasable, and a rear end forms a piston chamber 6d in an inner portion which is closed by a rear wall 6c forming the sliding hole 6b in the center portion. Further, the piston 8 is moved in the back and forth direction by supplying and discharging a pressure fluid from a first supply and discharge port 6e and a second supply and discharge port 6f which are provided in the cylinder 6 positioned in an outer side of moving front and rear ends of the piston 8 stored within the piston chamber 6d, a long hole 6g is formed at a position which comes into line with the coupling pin thread hole 7g while being overlapped with a front end outer peripheral portion of the yoke 7, and the cylinder 6 is detachably mounted to the yoke 7 by engaging and attaching a coupling pin 15 from above the long hole 6g. Further, the cylinder 6 is provided with a handle 16 so that the cylinder 6 is carried easily at the time of attaching and detaching, a side thereof is provided with a rotation prevention pin 17 for preventing the piston 8 from rotating within the piston chamber 6d in such a manner as to punch through the cylinder 6 so as to slide along a side groove (not shown) of the cylinder 6, and a support lever 21 for fixing to a pedestal 18 by using a pressure plate 19 and a bolt 20 is fixed further below.

The piston 8 is provided with a piston coupling rod 8a in which a female thread is formed in an inner side for engaging with the coupling portion 9a of the guide rod 9, and the piston coupling rod 8a moves forward and backward in accordance with the movement of the piston 8 within the sliding hole 6b of the rear wall 6c provided in the rear end of the cylinder 6. Accordingly, the guide rod 9 can move forward and backward in the same direction at the same speed when the pressure fluid is supplied and discharged in a controlled manner to the first supply and discharge port 6e and the second supply and discharge port 6f, whereby the piston 8 is moved in the back and forth direction.

Since the pipe expanding rubber 12 is formed in a ring shape, as is well expressed in FIGS. 1, 3 and 4, and is formed in a taper shape in such a manner that a diameter of an outer periphery of an end portion in the back and forth direction side becomes smaller than the center portion, the center portion is volumetrically expanded more in an outer peripheral direction when a pinching force in the back and forth direction acts so as to efficiently expand the thin wall stainless steel pipe 2. The pipe expanding rubber 12 is externally fitted to the sliding portion 9b of the guide rod 9, and a rear side end surface thereof is used by being brought into contact with the step portion 10.

The backup ring 11 is externally fitted to the sliding portion 9b in such a manner as to come into contact with the front side end surface of the pipe expanding rubber 12 which is externally fitted to the sliding portion 9b of the guide rod 9, and is structured such as to come into internal contact with an inner peripheral surface of the thin wall stainless steel pipe 2 which comes into internal contact with the inner peripheral surface of the fitting hole 7b of the yoke 7, at the time of starting the pipe expansion. Accordingly, since the inner and outer peripheral surfaces of the end portion of the thin wall stainless steel pipe 2 are fixed in a linear direction, there is generated such an advantage that a shape change of the end portion is not generated so as to keep a linear state, a connecting step in the later step can be easily carried out, and a turbulent flow is not generated in a fluid flowing within the thin wall stainless steel pipe 2, even in the case where a force in an outer peripheral direction is applied by swelling of the pipe expanding rubber 12 at the time of the pipe expansion.

A description will be given of a work for expanding the end portion of the thin wall stainless steel pipe 2 by the pipe expanding apparatus 1 of the thin wall stainless steel pipe according to the present invention having the structure mentioned above.

First of all, the coupling pin thread hole 7g and the long hole 6g are brought into line with each other so as to be engaged and fixed by the coupling pin 15, by pressing the support lever 21 of the cylinder 6 shown in FIG. 1 to the pedestal 18 by the pressure plate 19 so as to fix, and fitting the front outer peripheral portion of the yoke 7 to the rear end opening portion of the cylinder 6 so as to overlap. Further, as shown in FIG. 3, the pipe expanding rubber 12 and the backup ring 11 are fitted to the sliding portion 9b of the guide rod 9 in order, and are inserted into the rod sliding hole 7c of the yoke 7 from the coupling portion 9a side. The guide rod 9 is engaged with and fixed to the piston coupling rod 8a by rotating the guide rod 9 if a leading end of the coupling portion 9a comes into contact with the female thread formed in the inner side of the piston coupling rod 8a. Therefore, both end surfaces of the pipe expanding rubber 12 comes to a state in which they are sandwiched by the step portion 10 and the backup ring 11.

Next, the thin wall stainless steel pipe 2 is pressed until the front end thereof strikes against the yoke 7 by fitting the fitting inner hole 5a of the flange 5 to the thin wall stainless steel pipe 2 and thereafter externally fitted to the guide rod 9. Accordingly, the inner and outer peripheral surfaces of the end portion of the thin wall stainless steel pipe 2 come to a state in which they are sandwiched between the outer peripheral surface of the backup ring 11 and the inner peripheral surface of the fitting hole 7b of the yoke 7.

Next, the flange 5 externally fitted to the outer peripheral surface of the thin wall stainless steel pipe 2 is moved so as to be closely attached to the annular collar portion 7a of the yoke 7, and the protruding annular portion 5c of the flange 5 is fitted into the expanded inner hole portion 7e formed in the rear open end surface in the rear side of the yoke 7. Further, as is well expressed in FIGS. 3 and 4, after the pinching lever 13 and a spaced pipe 23 are fitted to the coupling bolt 22, the coupling bolt 22 is screwed into the coupling hole 7h provided in the annular collar portion 7a so as to be fixed in a state in which the lower side of the pinching lever 13 is brought into contact with the circular arc projection 5f of the flange 5. Since the spaced pipe 23 is structured in advance to have approximately the same length as the thickness except the protruding annular portion 5c of the flange 5, the flange 5 is sandwiched by the rear end surface of the annular collar portion 7a of the yoke 7, the expanded inner hole portion 7e and the pinching lever 13 so as to come to a state in which it is fixed to the yoke 7.

From the above state, if the pressure fluid is supplied to the first supply and discharge port 6e of the cylinder 6 and the second supply and discharge port 6f is connected to a tank under an ambient pressure, the piston 8 moves forward within the piston chamber 6d. Accordingly, the coupling portion 9a engaged with and fixed to the piston coupling rod 8a and the guide rod 9 moves forward. At this time, since the rear end surface of the pipe expanding rubber 12 comes into contact with the step portion 10, a width in an axial direction of the pipe expanding rubber 12 is compressed, and the pipe expanding rubber is volumetrically expanded in an outer peripheral surface direction by the compression, whereby the outer peripheral surface in the end portion of the thin wall stainless steel pipe 2 coming into contact with the outer peripheral surface of the pipe expanding rubber 12 is expanded until it comes into contact with the chevron shaped space portion 14 formed by the first taper portion 5b and the second taper portion 7d. Therefore, the chevron shaped projection portion 3 constructed by the one inclined surface 3a and the other inclined surface 3b is formed in both sides in a width direction of the end portion of the thin wall stainless steel pipe 2.

The force in the outer peripheral surface direction acting on the pipe expanding rubber 12 is transmitted to the annular collar portion 7a from the second taper portion 7d of the yoke 7, the expanded inner hole portion 7e and the protruding annular portion 5c via the thin wall stainless steel pipe 2 at the time of the pipe expansion. However, since the circular collar portion 7a is formed in a collar shape in a force acting direction, the circular collar portion 7a has a load bearing property and is not easily deformed. Further, since the force transmitted to the first taper portion 5b also acts on the annular flange 5, it has a load bearing property in an outer direction and is not easily deformed. As mentioned above, even in the case where the pipe expansion is repeatedly carried out by the yoke 7 and the flange 5, the strain is not generated.

When the expanded thin wall stainless steel pipe 2 is detached, the work is finished by returning the piston 8 rearward until it comes into contact with the rear wall 6c by charging the pressure fluid from the second supply and discharge port 6f so as to connect the first supply and discharge port 6e to the tank under the ambient pressure, thereafter loosening the coupling bolt 22 so as to detach the flange 5 from the yoke 7, and drawing out the thin wall stainless steel pipe 2 externally fitted to the guide rod 9. At this time, since the pipe expanding rubber 12 swelling in the outer peripheral direction is returned to a state in which the outer periphery is flat in FIG. 3 from FIG. 4 by the restoring force of the pipe expanding rubber 12 itself, in accordance with the movement of the piston 8 in the rear side, the pipe expanding rubber 12 can be easily drawn out. Then, the pipe expanding work is finished. Further, the flange 5 externally fitted to the thin wall stainless steel pipe 2 is switched to the next step as it is in the externally fitted state. Further, when a new thin wall stainless steel pipe 2 is expanded, the thin wall stainless steel pipe 2 is fitted into the guide rod 9 from the rear end side thereof so as to charge the pipe expanding rubber 12 and the backup ring 11 to the inner side of the leading end portion thereof, and is pressed until the leading end strikes against the yoke 7, the flange 5 externally fitted in advance is fixed to the yoke 7 in the same step as mentioned above, and the pipe expansion is carried out by the same method as mentioned above. It is possible to carry out the pipe expansion of the thin wall stainless steel pipe 2 one after another, by repeating the works mentioned above.

Figure 7:
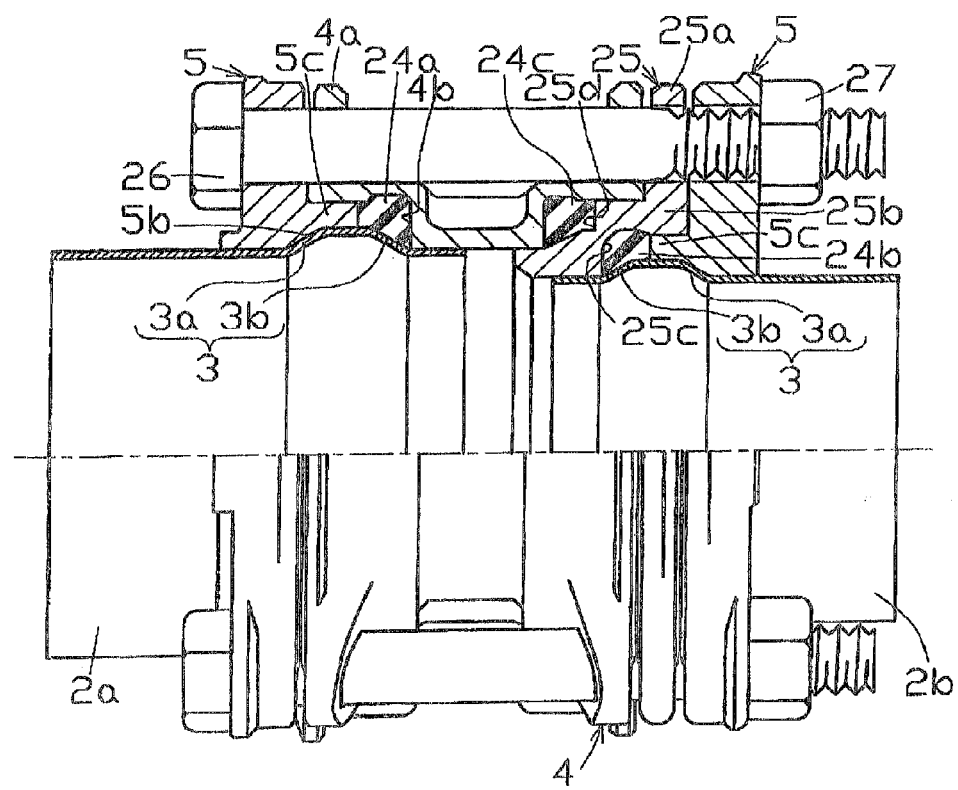
FIG. 7 is a cross sectional view showing a connection structure between the thin wall stainless steel pipe and a joint.
Figure 8:
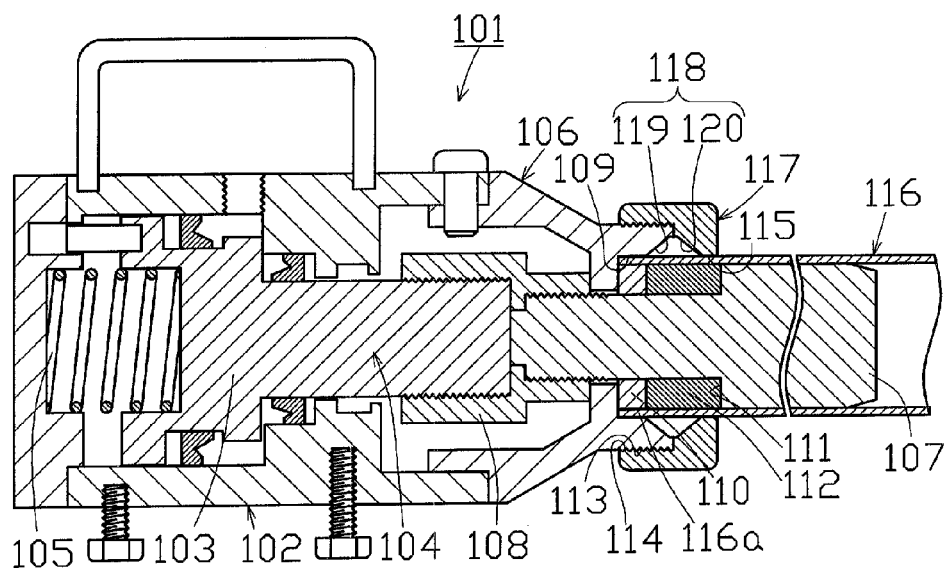
FIG. 8 is a cross sectional view of a pipe expanding apparatus of a thin wall stainless steel pipe according to a related art.
Figure 9:
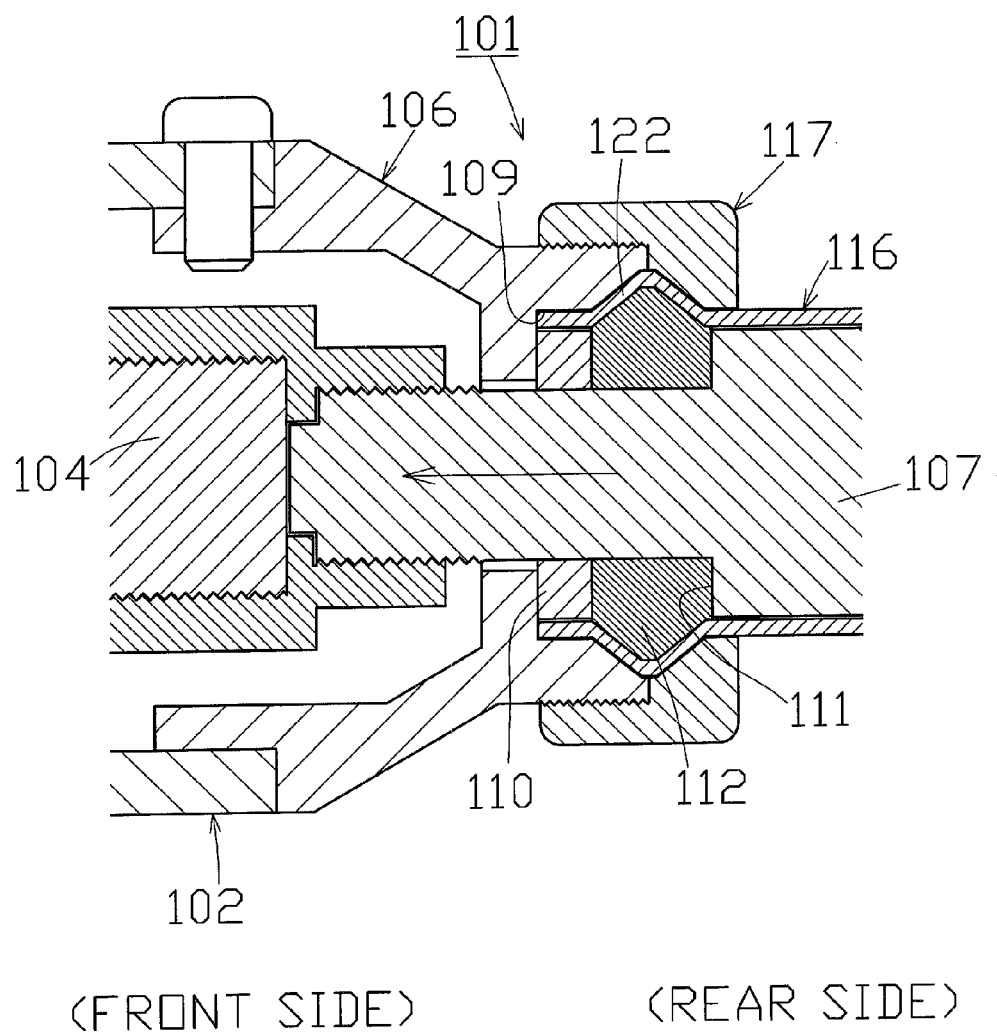
FIG. 9 is an enlarged cross sectional view in the vicinity of a pipe expanding head of the pipe expanding apparatus of the thin wall stainless steel pipe according to the related art.
Figure 10:
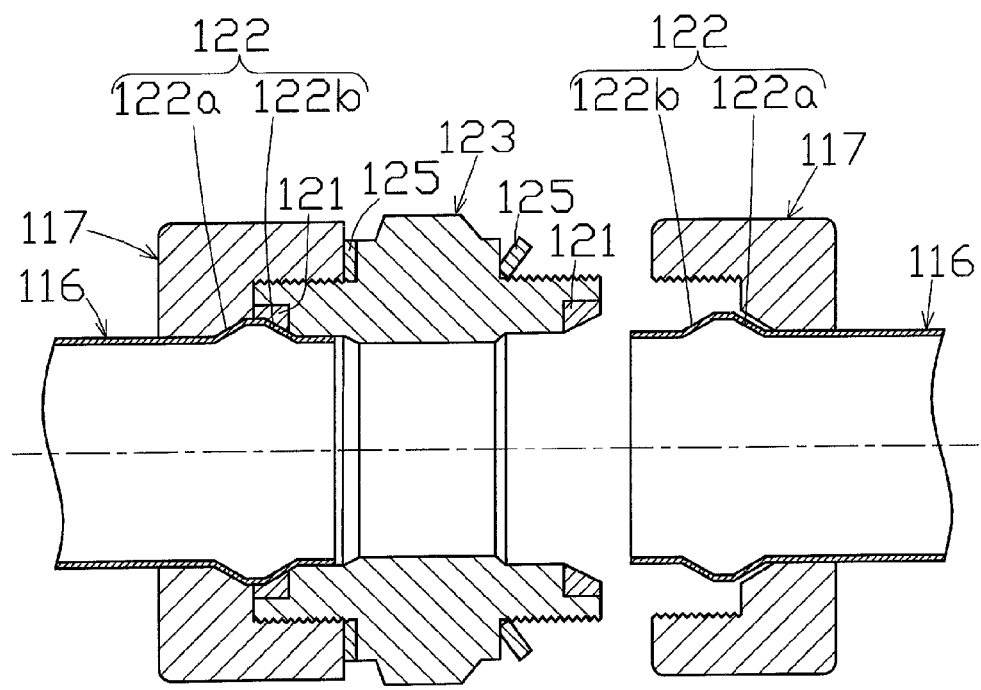
FIG. 10 is a cross sectional view showing a connection structure between the thin wall stainless steel pipe and a joint according to the related art.

The expanded thin wall stainless steel pipe 2 is used, for example, by being coupled to each other by an approximately concave cross sectional shaped joint 4 as shown in FIG. 7. In FIG. 7, there is shown an example in which two thin wall stainless steel pipes 2a and 2b having different diameters are coupled. In the left large-diameter thin wall stainless steel pipe 2a, the first taper portion 5b of the flange 5 used for the pipe expansion is brought into contact with one inclined surface 3a of the thin wall stainless steel pipe 2a. Further, one coupling portion 4a of the joint 4 is brought into contact with an inner surface of the flange 5, and a protruding annular portion 5c is pressed in a direction of the one inclined surface 3a. At this time, it is possible to provide a gasket between the thin wall stainless steel pipe 2a and the joint 4 by previously bringing a first gasket 24a stored in the first concave portion 4b of the joint 4 into contact with the other inclined surface 3b.

In the case of the right small-diameter thin wall stainless steel pipe 2, it has the same structure except for a structure in which an annular gasket receiving member 25 is interposed between the flange 5 and the joint 4 for dissolving a difference in diameter. In other words, a cross section of the gasket receiving member 25 is formed approximately in an L-shaped form, a rising piece 25a thereof is brought into contact with the inner surface of the flange 5, and a protruding annular portion 5c is pressed in a direction of the one inclined surface 3a. Further, a second gasket 24b is charged in a second concave portion 25c formed further below a lower annular portion 25b so as to be brought into contact with the other inclined surface 3b, thereby preventing a water leakage from a gap between a lower surface of the annular portion 25b and the thin wall stainless steel pipe 2b. On the other hand, a third gasket 24c is charged between a third concave portion 25d formed above the annular portion 25b and the first concave portion 4b so as to prevent a water leakage between the annular portion 25b and the joint 4. By fastening two right and left flanges 5, the joint 4 interposed therebetween, and the gasket receiving member 25 by a connection bolt 26 and a nut 27 passing therethrough, two thin wall stainless steel pipes 2a and 2b having the different diameters are fastened in such a direction so as to come close to each other while sandwiching the joint 4 in the middle thereof, whereby the coupling is finished.

The pipe expanding apparatus of the thin wall stainless steel pipe according to the present invention is compact and inexpensive, and the apparatus can be brought in a construction site in which the thin wall stainless steel pipe is piped so as to be operated, and therefore, it can be widely utilized.

DESCRIPTION OF REFERENCE NUMERALS

1 FRONT SIDE
2 REAR SIDE
1 PIPE EXPANDING APPARATUS OF THIN WALL STAINLESS STEEL PIPE
2 THIN WALL STAINLESS STEEL PIPE
3 CHEVRON SHAPED PROJECTION PORTION
3a, 3b INCLINED SURFACE
4 JOINT
5 FLANGE
6 CYLINDER
7 YOKE
8 PISTON
9 GUIDE ROD STEP PORTION
11 BACKUP RING
12 PIPE EXPANDING RUBBER

What is claimed is:

1. A pipe expanding apparatus of a thin wall stainless steel pipe, comprising:

a flange having a fitting inner hole to which the thin wall stainless steel pipe is internally fitted, a first taper portion which is formed in a front side of the fitting inner hole and is inclined in such a manner that a front side is expanded, a protruding annular portion which has approximately the same inner diameter as an inner diameter of a front end portion of the first taper portion and has a predetermined thickness and protrudes forward, and a joint coupling hole which inserts a bolt coupling to the joint in an outer peripheral portion;

a yoke detachably fixed to a front side of the flange, having a fitting hole to which an end portion of the thin wall stainless steel pipe is internally fitted, a rod sliding hole which is arranged in a front side of the fitting hole and has a smaller diameter than the fitting hole, and an expanded inner hole portion which is expanded at approximately the same length as a thickness of the protruding annular portion, and a second taper portion inclined in such a manner that a front side is contracted and forming an outer peripheral annular collar portion capable of being coupled to the flange via a coupling device in an outer peripheral side of the expanded inner hole portion;

a backup ring fitted to an inner side of the fitting hole in an inner side of the fitting inner hole and an end portion of the thin wall stainless steel pipe arranged in an inner side in a diametrical direction of the fitting hole;

a guide rod having a sliding portion which is movable in a back and forth direction within the rod sliding hole, by being coupled to a piston which is movable in a back and forth direction by a drive source in an inner portion of the cylinder coupled to the yoke, and an outer fitting portion which externally fits the thin wall stainless steel pipe having a larger diameter than the sliding portion and positioned in a rear side; and a pipe expanding rubber externally fitted to the sliding portion between the backup ring and a step portion of the sliding portion and the outer fitting portion of the guide rod, and pinched between the step portion and the backup ring;

wherein the coupling device is provided with a pinching lever which comes into contact with an outer surface of the flange, and a coupling bolt which fastens and fixes the pinching lever to the outer peripheral annular collar portion of the yoke via a spaced pipe.

2. The pipe expanding apparatus of a thin wall stainless steel pipe according to claim 1, wherein the pipe expanding rubber is formed in a ring shape, and is formed in a taper shape in such a manner that a diameter of an outer periphery of an end portion in a back and forth direction becomes smaller than that of a center portion.

3. The pipe expanding apparatus of a thin wall stainless steel pipe according to claim 1, wherein the pipe expanding rubber is formed in a ring shape, and is formed in a taper shape in such a manner that a diameter of an outer periphery of an end portion in a back and forth direction becomes smaller than that of a center portion.

* * * * *